United States Patent
Shenker

[11] 4,029,396
[45] June 14, 1977

[54] LENS SYSTEM FOR MODIFYING SPHERICAL ABERRATION

[75] Inventor: Martin Shenker, Pomona, N.Y.

[73] Assignee: Farrand Optical Co., Inc., Valhalla, N.Y.

[22] Filed: Aug. 6, 1976

[21] Appl. No.: 712,414

[52] U.S. Cl. .................................. 350/188; 350/220
[51] Int. Cl.² .................. G02B 13/20; G02B 9/34
[58] Field of Search ........................... 350/220, 188

[56] References Cited
UNITED STATES PATENTS

| 65,729 | 6/1867 | Dallmeyer | 350/188 |
| 1,446,634 | 2/1923 | Bell et al. | 350/188 |

Primary Examiner—Paul A. Sacher
Attorney, Agent, or Firm—John L. Downing

[57] ABSTRACT

A lens system for modifying the spherical aberration of optical apparatus comprises three groups of lens elements arrayed in order along an optical axis of the apparatus: a first lens group has a negative optical power; a second lens group has substantially zero optical power and is bent to have a substantial amount of spherical aberration; and a third lens group has a positive optical power. The relative spacing between the second lens group and the first and third lens groups is variable to modify the spherical aberration introduced into the optical apparatus.

5 Claims, 2 Drawing Figures

LENS SYSTEM FOR MODIFYING SPHERICAL ABERRATION

FIELD OF THE INVENTION

The present invention relates to optical apparatus, and more particularly to a lens system for correcting the varying spherical aberration of a tilt lens as used in a Scheimpflug-type optical probe.

BACKGROUND OF THE INVENTION

Optical simulation applications such as aircraft flight simulation often employ an optical probe which is moved over a scale model of terrain at a variable altitude and which transmits an image of the terrain model to a sensor, e.g. a vidicon camera tube. Optical probes of the Scheimpflug type are particularly effective in this application since they provide erect images of the terrain model with near infinite depth of field. Such a probe has three basic elements: an objective for viewing an object plane and forming an image of the object; a tilt-focus relay lens for receiving that image; and a sensor for receiving the projected image relayed by the tilt-focus relay lens. These elements are arranged to satisfy the Scheimpflug condition which states that plane containing the original object, the plane containing the projected image, and the principal plane of the objective lens all intersect along one common line defined by Scheimpflug as the axis of colineation. (See U.S. Pat. No. 751,347 issued Feb. 2, 1904.) Optical scanning probes of this type are described in "Optical Scanning Probe Technology (Tutorial)" by Martin Shenker, Procedings of the Society of *Photo-Optical Instrumentation Engineers, Simulators* ␣ *Simulation*, vol. 59, pp. 71 –79 March, 1975.

The tilt-focus relay lenses used in these optical probes are adjustably inclinable relative to the optical axis of the probe. Experience in the design of such tilt-focus lenses has demonstrated that there is a limit to the tilt angle that can be achieved with these lenses with acceptable spherical aberration. Although the tangential oblique spherical aberration can be controlled or corrected, the sagittal oblique spherical aberration was essentially unalterable — remaining as a significant over-correction, increasing rapidly with increasing tilt angle.

In the course of studying this problem of spherical aberration in tilt-focus relay lenses, I discovered that if the controllable tangential oblique spherical aberration could be made to match the sagittal oblique aberration of such a lens, then the amount of spherical aberration could be corrected by additional axial components within the probe, and these additional components could introduce a variable amount of spherical aberration into the system —the amount being variable with the tilt of the tilt-focus lens. My present invention provides a simple solution to this problem, one embodiment of that invention comprising only four lenses in an afocal system.

SUMMARY OF THE INVENTION

The present invention provides a lens system for modifying the spherical aberration of an element in an optical apparatus such as a tilt-focus relay lens in an optical probe of the Scheimpflug type. The lens system comprises a first second and third group of lens elements arrayed in order along the optical axis of the probe. The first lens group has a negative optical power. The second lens group has substantially zero optical power, and has one or more lens elements bent to have a substantial amount of spherical aberration. The third lens group has a positive optical power to recollimate the divergence introduced by the first lens group. The relative spacing between the second lens group and said first and third lens groups is variable with the inclination of said tilt lens to the optical axis of the probe.

DESCRIPTION OF A SPECIFIC EMBODIMENT

Figure 1:
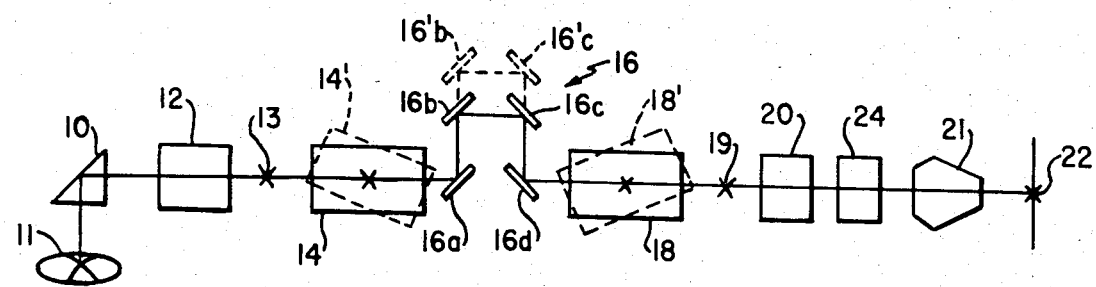
FIG. 1 is a schematic diagram showing the basic elements of a Scheimpflug-type optical probe.

FIG. 1 shows the basic elements of a Scheimpflug-type optical probe similar to that described in the above-mentioned Procedings of the Society of Photo-Optical Instrumentations Engineer's article.

An adjustable pitch prism 10 transmits an image of a desired region of the object plane 11 to an objective 12 which sends the image through focal point 13 to a first tilt-focus relay lens 14, whose axis is adjustably inclinable to the axis of the system as indicated by the dotted outline 14'. The images passes through the first tilt lens 14 to a focussing "trombone" 16 and then to a second tilt-focus relay lens 18. The first and second tilt-focus lenses 14 and 18 are mechanically arranged so that they tilt through the same angle (in opposite directions); thus the inclined dotted position 18' of the second tilt-focus lens 18 corresponds to the position 14' of the first tilt-focus lens 14.

The focusing "trombone" arrangement 16 comprises four mirror elements 16a —d. The mirrors 16b and 16c are movable relative to the mirrors 16a and 16d (as indicated by the dotted outlines 16'b and 16'c) and this relative distance is variable with the inclination of the first and second relay lenses 14 and 18 so that the change in total optical path length with the tilt of lenses 14 and 18 is compensated, and the front conjugate 13 of the first tilt lens 14 and the rear conjugate 19 of the second tilt lens 18 remain fixed with changing tilt angles of lenses 14 and 18. The dotted line positions 16'b and 16'c indicates a state of the "trombone" arrangement 16 corresponding to the positions 14' and 18' of the two tilt relay lenses 14 and 18, respectively.

The image of the object plane 11 continues on to a collimator 20 and ultimately to an adjustable roll prism 21 server (or sensor) at plane 22. Positioned between the collimator 20 and the roll prism 21 is a lens system 24 in accordance with the present invention which serves to modify and correct for the spherical aberration inherent in the two tilt-focus lenses 14 and 18, as described heretofore. The tilt focus lenses 14 and 18 are advantageously of a type and design similar to that described in a United States patent application filed by Edmund Lescher concurrently herewith titled "Relay Lens System", wherein the tangential oblique spherical aberration is advantageously made to match the sagittal oblique spherical aberration.

Figure 2:
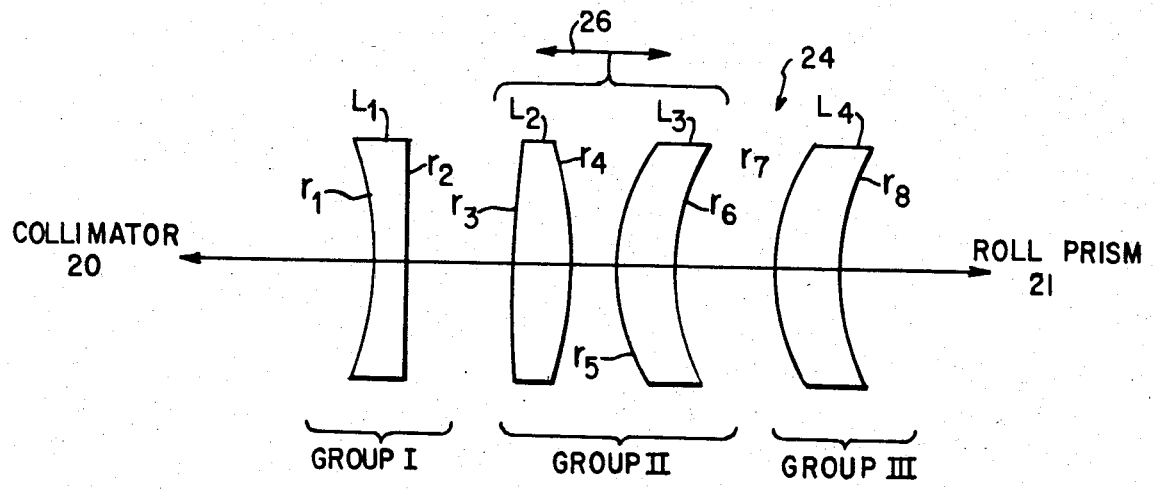
FIG. 2 is a schematic diagram illustrating one embodiment of a lens system in accordance with the present invention.

FIG. 2 shows the details of a specific embodiment of the lens system 24 in accordance with the present invention. A first lens $L_1$ having a negative optical power (comprising a first lens group) is positioned on the optical axis of the probe following the second tilt-focus relay lens 18 (FIG. 1). Second and third lenses $L_2$ and $L_3$, which comprise a second lens group and which have together substantially zero optical power are positioned between the first lens $L_1$ and a fourth lens $L_4$ (comprising a third lens group) along the axis. Lens $L_4$ has a positive optical power which tends to recollimate the divergence introduced by the first lens $L_1$. The relative position of the second lens group — lenses $L_2$ and $L_3$ — relative to the positions of lenses $L_1$ and $L_4$ is adjustable with the inclination of the tilt focus relay lenses as indicated by the arrow 26.

The lens elements of the system 24 of this embodiment have the following characteristics, where distance dimensions are given in millimeters, N is the index of refraction, and $\nu$ represents the Abbe No. of the lens element:

| Lens Group | Lens Element | Radius | Central Thickness | N | Abbe No. $\nu$ |
|---|---|---|---|---|---|
| I | 1 | $r_1=-97.82$ $r_2=\infty$ | 3.0 | 1.5168 | 64.17 |
| II | 2 | $r_3=1123.5$ $r_4=-100.0$ | 3.0 | 1.5168 | 64.17 |
|  | 3 | $r_5=37.04$ $r_6=25.64$ | 3.0 | 1.5168 | 64.17 |
| III | 4 | $r_7=25.77$ $r_8=33.33$ | 3.0 | 1.5168 | 64.17 |

First lens $L_1$ is spaced 22.2 mm. from the fourth lens $L_4$ and the second lens $L_2$ is spaced 2.0 mm. from the third lens $L_3$.

The desired position of the second group of lens elements of lens system 24 relative to the first and third groups will vary with the inclination of the tilt-focus lenses 14 and 18, and will also be related to the position of the rear conjugate 19 of tilt-focus lens 18 relative to the collimator 20.

Although the lens system of the present invention has been described in connection with an optical simulation probe of the Scheimpflug-type, it should be recognized that this invention may find utility in any application in which it is desired to modify the spherical aberration of an optical system without changing the focal dimensions of that system.

The lens system 24 of the described specific embodiment comprises a first, negative power lens group followed by a substantially zero power lens group bent for positive spherical aberration overcorrection, in turn followed by a third lens group having positive optical power. However, it will be obvious to those skilled in the art that for certain applications the lens group having positive power can advantageously be the first group and the negative power group be the last group in the optical train of the lens system of the invention. Similarly, the central, movable second lens group can be bent to have negative or spherical aberration undercorrection in either of these configurations and the resulting lens system can be used to modify the spherical aberration of various systems.

What is claimed is:

1. A lens system for modifying the spherical aberration of an optical apparatus, the lens system comprising first, second and third lens groups arrayed in order along the optical axis of said apparatus;

said first lens group having a negative optical power;

said second lens group having substantially zero optical power and having one or more lens elements bent to have a substantial amount of spherical aberration; and said third lens group having a positive optical power;

and wherein the relative spacing between said second lens group and said first and third lens groups is variable.

2. A lens system in accordance with claim 1 wherein said optical apparatus comprises an optical probe of the Scheimpflug type, and wherein the relative spacing between said second lens group and said first and third lens groups is variable with the inclination of a tilt-focus relay lens in said probe to the optical axis of said probe.

3. A lens system in accordance with claim 1 wherein one or more lens elements of said second lens groups is bent to have a positive spherical aberration.

4. A lens system in accordance with claim 1 wherein one or more lens elements of said second lens group is bent to have a negative spherical aberration.

5. A lens system according to claim 2 having the following characteristics, distance dimensions being given in millimeters:

| Group | Lens Element | Radius | Central Thickness | N | $\nu$ |
|---|---|---|---|---|---|
| I | 1 | $r_1=-97.82$ $r_2=\infty$ | 3.0 | 1.5168 | 64.17 |
| II | 2 | $r_3=1123.5$ $r_4=-100.0$ | 3.0 | 1.5168 | 64.17 |
|  | 3 | $r_5=37.04$ $r_6=25.64$ | 3.0 | 1.5168 | 64.17 |
| III | 4 | $r_7=25.77$ $r_8=33.33$ | 3.0 | 1.5168 | 64.17 | and wherein lens element (1) is spaced 22.2 mm. from lens element (4), and lens element (2) is spaced 2 mm. from lens element (3).

* * * * *